US006931601B2

(12) United States Patent
Vronay et al.

(10) Patent No.: US 6,931,601 B2
(45) Date of Patent: Aug. 16, 2005

(54) NOISY OPERATING SYSTEM USER INTERFACE

(75) Inventors: David P. Vronay, Bellevue, WA (US); Lili Cheng, Bellevue, WA (US); Baining Guo, Beijing (CN); Sean U. Kelly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 566 days.

(21) Appl. No.: 10/117,406

(22) Filed: Apr. 3, 2002

(65) Prior Publication Data

US 2003/0189586 A1 Oct. 9, 2003

(51) Int. Cl.[7] ............................. G06F 3/14; G06T 15/50
(52) U.S. Cl. ....................... 715/767; 715/764; 715/848; 715/782; 345/426
(58) Field of Search ................................. 715/850, 426, 715/767, 768, 790, 764, 782, 848, 849, 775, 778, 976; 345/426, 419

(56) References Cited

U.S. PATENT DOCUMENTS

| | | | | |
|---|---|---|---|---|
| 5,861,885 A | * | 1/1999 | Strasnick et al. | ........... 715/850 |
| 6,281,898 B1 | * | 8/2001 | Nikolovska et al. | ........ 715/848 |
| 6,433,840 B1 | * | 8/2002 | Poppleton | .................... 348/745 |
| 6,522,347 B1 | * | 2/2003 | Tsuji et al. | .................. 715/848 |
| 6,678,866 B1 | | 1/2004 | Sugimoto et al. | |

OTHER PUBLICATIONS

The Design of Personal Ambient Displays, Craig A Wisneski, Jan. 1999, MIT University.*
Laurent Denoue, et al., AttrActive Windows: Dynamic Windows for Digital Bulletin Boards, CHI 2003: New Horizons, 2003, pp. 746–747, Ft. Lauderdale, Florida, USA.
F. Wai–Ling Ho–Ching, et al., Can you see what I hear? The Design and Evaluation of a Peripheral Sound Display for the Deaf, CHI 2003, 2003, pp. 161–168, Ft. Lauderdale, Florida, USA.
D. Scott McCrickard, et al., A Model for Notification Systems Evaluation–Assessing User Goals for Multitasking Activity, ACM Transactions on Computer–Human Interaction, 2003, pp. 312–338, vol. 10–No. 4.
Blair MacIntyre, et al., Support for Multitasking and Background Awareness Using Interactive Peripheral Displays, UIST 2001, 2001, pp. 41–50, Orlando, Florida, USA.

* cited by examiner

*Primary Examiner*—Raymond J. Bayerl
(74) *Attorney, Agent, or Firm*—Amin & Turocy, LLP (57) ABSTRACT

An operating system shell provides on a display screen a graphical user interface through which a user interacts with the operating system. The operating system shell provides a background noisy display rendered on the display screen in accordance with a background physical lighting model, and an ambient notification rendered over at least a portion of the background noisy display to provide a user notification. The ambient notification is rendered in accordance with an ambient notification physical lighting model that is different from the background physical lighting model.

38 Claims, 4 Drawing Sheets

NOISY OPERATING SYSTEM USER INTERFACE

FIELD OF THE INVENTION

The present invention relates to graphical user interfaces for computer operating systems and, in particular, to a graphical user interface that includes a visually noisy background and ambient notifications for users.

BACKGROUND AND SUMMARY OF THE INVENTION

It is now common for operating systems to have a shell that provides a graphical user interface (GUI). The shell is a piece of software (either a separate program or component part of the operating system) that provides direct communication between the user and the operating system. The graphical user interface typically provides a graphical icon-oriented and/or menu driven environment for the user to interact with the operating system.

The graphical user interface of many operating system shells is based on a desktop metaphor that creates a graphical environment simulating work at a desk. These graphical user interfaces typically employ a windowing environment with the desktop.

The windowing environment presents the user with specially delineated areas of the screen called windows, each of which is dedicated to a particular application program, file or document. Each window can act independently, as if it were a virtual display device under control of its particular application program. Windows can typically be resized, moved around the display, and stacked so as to overlay another. In some windowing environments, windows can be minimized to an icon or increased to a full-screen display.

Windows may be rendered beside each other or may have a top to bottom order in which they are displayed, with top windows at a particular location on the screen overlaying any other window at that same location according to a z-order (an order of the windows along a conceptual z-axis normal to the desktop or display screen). The top-most window has the "focus" and accepts the user's input. The user can switch other windows to the top (and thereby change the z-order) by clicking on the window with a mouse or other pointer device, or by inputting certain key combinations. This allows the user to work with multiple application programs, files and documents in a manner similar to physically working with multiple paper documents and items that can be arbitrarily stacked or arranged on an actual desk.

In conventional graphical user interfaces all major graphical user interface objects (e.g., windows, icons, toolbar, etc.) are typically rendered as fixed, static graphical objects. Changes in the user interface that arise when a system notification is provided to a user are typically rendered as a fixed, static change to the user interface. The intent is that the notification attract the user's attention from another ongoing task or operation. For example, a conventional static user notification could include a notification window that pops-up on a user display screen (e.g., to notify a user of new email), or a change in color of a display object (e.g., the name of a friend in a list of messaging chat buddies indicating the a user has signed on or off), etc.

As part of a psychological phenomenon known as the "just noticeable difference", or JND, human visual perception is highly sensitive to change. JND is the amount of change in a perceptual signal (such as a change in the pitch or volume of a sound or the color or intensity of light) that is conspicuous to a person's consciousness. An aspect of the optical characteristics of conventional graphical user interfaces is that the display changes that are used to provide user notifications are highly distracting to users. The reason is that the display changes that occur with notifications occur in the context of static displays with virtually no display variation. Such dramatic user notifications may be warranted for important system notifications. However, dramatic user notifications of ordinary system events can be highly distracting and disruptive for users who have multiple applications operating concurrently.

Accordingly, the present invention includes a software application or an operating system shell that provides on a display screen a graphical user interface through which a user interacts with computer software (e.g., the operating system). In one implementation, an operating system shell provides a background noisy display rendered on the display screen in accordance with a background physical lighting model, and an ambient notification rendered over at least a portion of the background noisy display to provide a user notification. The ambient notification is rendered in accordance with an ambient notification physical lighting model that is different from the background physical lighting model.

In one implementation the background physical lighting model and the ambient notification physical lighting each are based upon a noisy user interface object data structure that includes desktop element models, desktop element texture maps, and a lighting model. The desktop element models provide three-dimensional representations of plural noisy graphical user interface desktop objects (e.g., windows, icons, toolbar, etc.).

One or more desktop element texture maps are associated with each desktop element model, the desktop element texture maps including at least image color information for each desktop element model. The lighting model has one or more light source representations that each include a light color, light intensity, and light direction, for example. A three-dimensional rendering engine provides three-dimensional rendering on a display screen of noisy graphical user interface desktop objects based upon the desktop element models, the desktop element texture maps, and the lighting model.

The background noisy display may be implemented by rendering user interface objects and lighting effects between them with the three-dimensional rendering engine based at least upon the desktop element models and the lighting model. Three-dimensional or physical lighting interactions between the user interface objects can provide a background noisy display to which users can acclimate and on which ambient notifications can be applied. Ambient notifications can be of perceptual amplitudes that are great than or less than the "just noticeable difference" (JND) change in a perceptual signal.

The ambient notification can provide notification information to a user without having to bring to the front of other active user interface objects (e.g., windows) a notification or a window with notification, or otherwise alter the screen layout in a distracting fashion. The ambient notification may be implemented as optical or visual effects, such as inter-object lighting, shadows, or surface effects, for example, to provide notification information. As a result, the user can readily perceive ambient notifications without the disruptions of conventional static system notifications.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
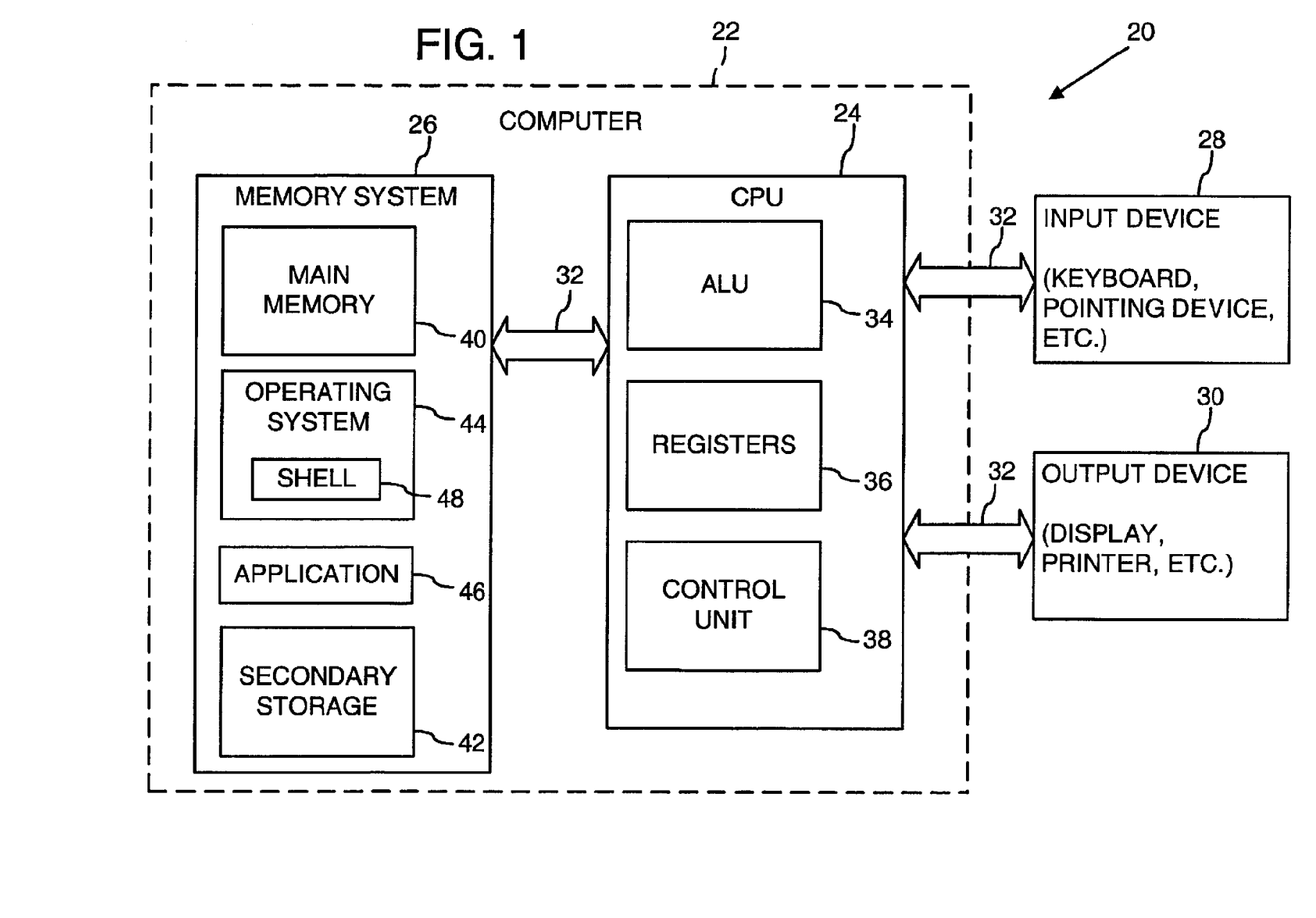
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system 44 and typically at least one application program 46. Operating system 44 is the set of software that controls the computer system operation and the allocation of resources. Application program 46 is the set of software that performs a task desired by the user, using computer resources made available through operating system 44. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Operating system 44 has a shell 48 that provides a graphical user interface (GUI). The shell 48 is a piece of software (either a separate program or component part of the operating system) that provides direct communication between the user and operating system 44. The graphical user interface typically provides a graphical icon-oriented and/or menu driven environment for the user to interact with the operating system. The graphical user interface of many operating system shells is based on or referred to as a desktop metaphor in which a graphical environment simulates working at a desk. These graphical user interfaces typically employ a windowing environment within the desktop metaphor.

Figure 2:
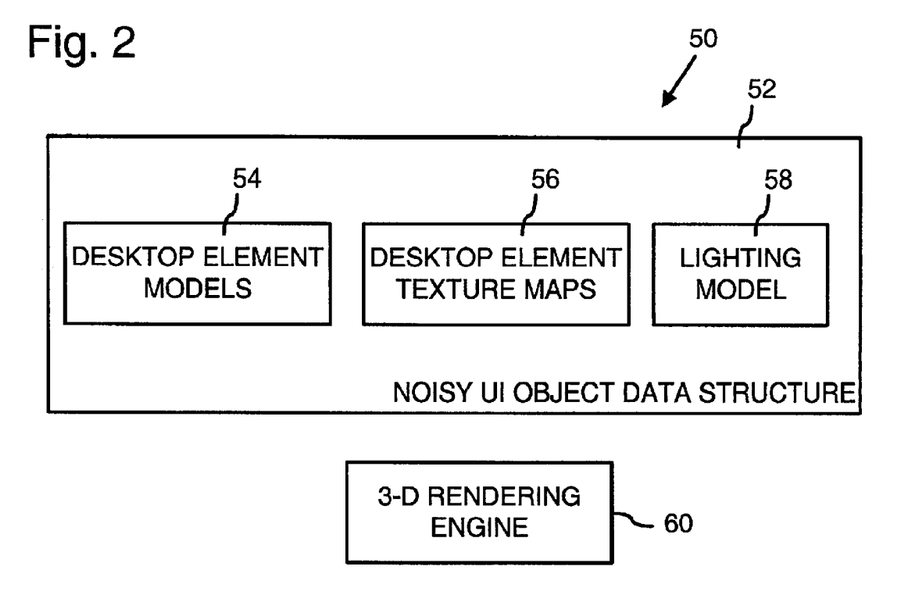
FIG. 2 is a block diagram of a noisy graphical user interface system in accordance with the present invention.

FIG. 2 is a block diagram of a noisy graphical user interface system 50 to be included in a shell 48 of an operating system 44. Noisy user interface system 50 includes a noisy user interface object data structure 52 stored in a computer readable medium for generating noisy graphical user interface desktop objects (e.g., windows, icons, toolbar, etc.) in accordance with the present invention.

Noisy user interface system 50 renders noisy graphical user interface desktop objects (e.g., windows, icons, toolbar, etc.) based upon user interface object data structure 52 to allow a user to interact with operating system 44 or an application 46 running operating system 44. Noisy user interface system 50 is capable of providing visual or audio ambient notification to users, as described below in greater detail. The following description is directed primarily to providing visual ambient notification to users, but is similarly applicable to providing audio ambient notification to users.

Noisy user interface object data structure 52 includes desktop element models 54 that provide a three-dimensional representation of each graphical user interface desktop object (e.g., window, icon, toolbar, etc.). For example, each three-dimensional representation may include a mesh of triangles that form and define a surface for each graphical user interface desktop object. In contrast, desktop objects in conventional graphical user interfaces are formed as flat, two-dimensional graphical objects (e.g., bitmaps) that may include a fixed bitmap pattern that simulates a shadowing effect.

Noisy user interface object data structure 52 also includes one or more desktop element texture maps 56 that are associated with each desktop element model 54. Texture maps 56 are graphic files that include image color information similar to that of bitmaps, but texture maps 56 further include information about one or more of the reflectivity, transparency, reflection, refraction, or other optical properties of a surface. For example, texture maps applied to a spherical object can make it appear as one of a glass ball, the planet Earth, or a basketball, as is known in the art. It will be appreciated that desktop element texture maps 56 may alternatively be implemented as instructions to a shading engine, such as a DirectX™ shading engine (e.g., version 8 or later) included in some software available from Microsoft Corporation, the assignee of the present invention.

Noisy user interface object data structure 52 further includes a lighting model 58 having one or more light source representations that each include a light color, light intensity, light direction, etc. A three-dimensional rendering engine 60 provides three-dimensional rendering of noisy graphical user interface desktop objects of a noisy graphical user interface based at least upon desktop element models 54 and lighting model 58, but typically also based upon desktop element texture maps 56.

Figure 3:
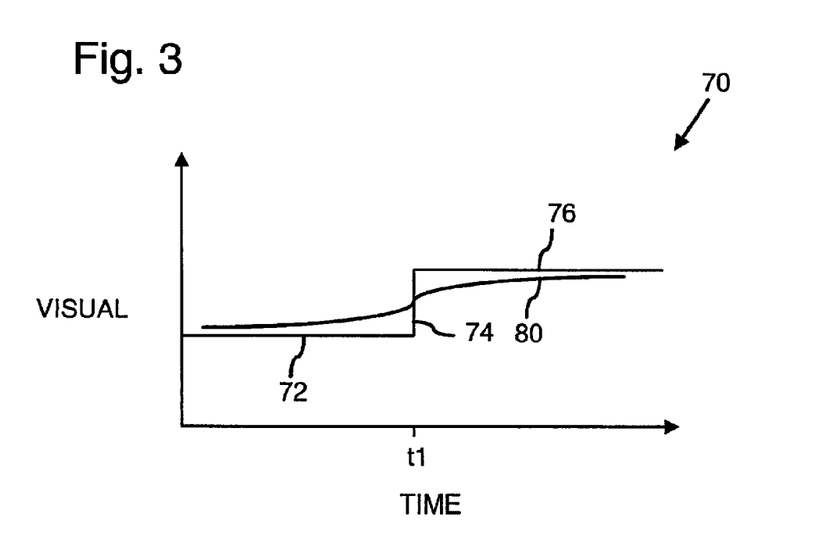
FIG. 3 is a graph illustrating visual characteristics over time of a conventional graphical user interface.

FIG. 3 is a graph 70 illustrating visual characteristics over time of a conventional graphical user interface. The vertical axis represents visual characteristics of the conventional graphical user interface, including display intensity, color, etc. The horizontal axis represents time.

An initial static display period 72 illustrates conventional static optical characteristics of conventional graphical user interface, indicating that typically all major graphical user interface objects (e.g., windows, icons, toolbar, etc.) are rendered as fixed, static graphical objects. A step 74 to a subsequent static display period 76 represents a conventional static user notification being rendered at a time t1, the conventional static user notification being a fixed and enduring change to the graphical user interface. For example, the conventional static user notification represented by step 74 could include a notification window that pops-up on a user display screen (e.g., to notify a user of new email), or a change in color of a display object (e.g., the name of a friend in a list of messaging chat buddies indicating the a user has signed on or off), etc. Such conventional user notifications typically remain a static part of the user interface until manually accepted or closed by the user.

As illustrated in graph 70, the optical characteristics over time of a conventional graphical user interface may be characterized as comprising primarily periods of static display (e.g., static display periods 72 and 76). User notifications (e.g., step 74) provide generally instantaneous transitions between the static display periods.

An aspect of the visual characteristics of conventional graphical user interfaces is that the display variation steps (e.g., step 74) of user notifications are highly distracting to users. The reason is that the display variation steps occur in the context of virtually no display variation (i.e., static display periods 72 and 76). Such dramatic user notifications may be warranted for important system notifications. However, dramatic user notifications of ordinary system events can be highly distracting and disruptive for users who have multiple applications operating concurrently.

As part of a psychological phenomenon known as the "just noticeable difference", or JND, human visual perception is highly sensitive to change. JND is the amount of change in a perceptual signal (such as a change in the pitch or volume of a sound or the color or intensity of light) that is conspicuous to a person's consciousness.

The JND has been well-studied and is known for most human senses. It is normally expressed in terms of a percentage change to a signal over a certain interval. For example, a person might jump from his or her seat if television volume is suddenly turned up, but the person might not even notice the volume change if it occurs over the course of an hour. In the latter instance, it might at some point occur to the person that the television is too loud.

People can perceive changes even without being consciously aware of changes below the JND. For instance, it is impossible not to notice a telephone ringing in one's own quiet office. But if one works in a phone bank, where dozens or hundreds of phones are always ringing, it would be difficult or impossible to process every ring. However, a person working on the phone bank might have a general (ambient) sense of whether it was a busy day or a slow day even without being consciously aware of each individual ring.

FIG. 3 includes a graph 80 illustrating an exemplary JND. Perceptual changes above the JND (e.g., graph 80) require conscious thought to process, even if that processing is to ignore the changes. Perceptual changes below the JND can be registered or ignored "automatically", without involving conscious thought. A conventional notification represented by step 74, such as when an email message arrives, suddenly jumps across the JND level of graph 80 and thus forces itself into a user's conscious perception.

Habituation is also a factor in the JND. Consider a ticking clock in a person's office. At first, the ticking could be annoying. The sound is above the JND. But over time, the person will habituate to the ticking. The person no longer perceives a base signal of silence that is interrupted by ticking. Instead, the person has a base signal that is one tick per second. The clock ticking will no longer be noticeable, as long as the ticking does not change (e.g., speed up, slow down, or increase or decrease in volume) above the JND. With regard to FIG. 3, a user will typically habituate to the static signal 76 over time following a disruptive notification represented by step 74. This example of habituation illustrates that a "just noticeable difference" is based upon an underlying or base perceptual signal, otherwise any signal change would be above the JND.

The present invention provides a noisy graphical user interface that applies the principles of JND in the context of computer user interfaces, such as those provided by an operating system shell or a software application. In one implementation, a noisy graphical user interface of this invention uses a background user interface with a non-zero perceptual (e.g., visual) noise level, such as by adding a ticking clock or a visual analog, for example. Within this noisy context, ambient notifications can be provided by modulating the noise, such as by modulating the noise below the level of the JND. As described below in greater detail, an appropriate background noise level can be provided by applying a physical lighting model on the user interface. A physical lighting (as opposed to a ticking clock or other signal) can utilize lighting variations to which the human brain has been habituated through millions of years of evolution.

Figure 4:
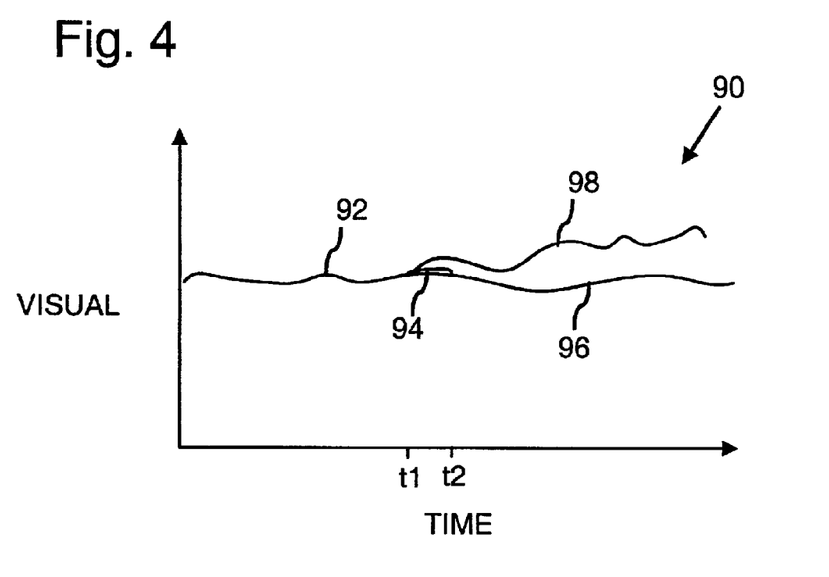
FIG. 4 is a graph illustrating visual characteristics over time of a noisy graphical user interface according to the present invention.

FIG. 4 is a graph 90 illustrating visual characteristics over time of a noisy graphical user interface according to the present invention. The vertical axis represents visual characteristics of the noisy graphical user interface, including display intensity, color, etc. The horizontal axis represents time.

An initial noisy display period 92 illustrates background noisy optical characteristics of a graphical user interface, indicating that typically major graphical user interface objects (e.g., windows, icons, toolbar, etc.) are rendered as variable graphical objects. Although illustrated with exaggerated effect in FIG. 4, the visual variations in the variable graphical objects would typically be of relatively low amplitude so as to be below the JND. These non-zero visual variations of initial noisy display period 92 are distinguished from conventional static, invariant display periods 72 and 76.

A notification amplitude variation 94 on top of or in addition to the background noisy optical characteristics of initial noisy display period 92 represents an ambient notification to a user being rendered beginning at a time t1. In the illustrated implementation, the notification amplitude variation 94 of the ambient notification is automatically of a limited duration (i.e., is temporary) and ends at a subsequent time t2. As a result, a subsequent noisy display period 96 following the end time t2 of notification amplitude variation 94 is analogous to the background noisy optical characteristics of initial noisy display period 92.

In this implementation, the notification amplitude variation 94 of the ambient notification is of an amplitude less than a "just noticieable difference" JND represented by a graph 98. It will be appreciated that in other implementations the notification amplitude variation 94 of the ambient notification may be of an amplitude greater than the "just noticieable difference" JND represented by a graph 98.

Initial and subsequent noisy display periods 92 and 96, respectively, may be implemented by rendering user interface objects and lighting effects between them with three-dimensional rendering engine 60 based at least upon desktop element models 54 and lighting model 58. Three-dimensional or physical lighting interactions between the user interface objects can provide a background noisy display to which users can acclimate and on which ambient notifications can be applied.

In other implementations, the background noisy display can further include additional display variations. For example, the lighting model 58 used with desktop element models 54 by three-dimensional rendering engine 60 establishes a position for a light source illuminating the user interface objects. One display variation for the background noisy display could effect movement of the light source through the course of a day analogous to movement of the sun across the sky. The directions of shadows and reflections between noisy graphical user interface objects would slowly shift through the course of a day.

As another example, outdoor weather conditions could be incorporated into the lighting model that is applied for the background noisy display. In simulating natural lighting variations, such a display variation in combination with three-dimensional or physical lighting interactions between the user interface objects provides a background noisy display over which ambient notifications can be rendered without excessively distracting a user from a task at hand.

Ambient notifications can be implemented in a variety of ways, including inter-object lighting, shadows, short-term surface effects, and long-term surface effects. These ambient notifications can be rendered by noisy graphical user interface system 50 included in shell 48 of operating system 44.

Figure 5:
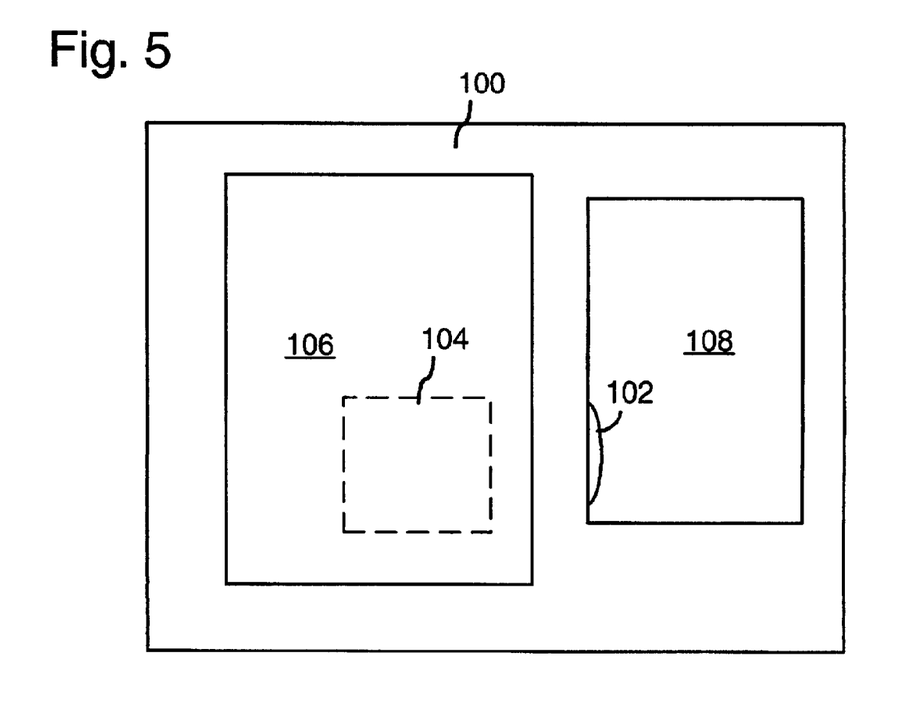
FIG. 5 is a schematic illustration of a noisy user interface desktop as rendered on a display screen with ambient notification provided by inter-object lighting.

FIG. 5 is a schematic illustration of a noisy user interface desktop 100 as rendered on a display screen with inter-object lighting 102 propagating from one user interface object to another. Inter-object lighting 102 can provide subtle effects across the user interface and may be implemented by turning on or off or changing (e.g., dimming or brightening) a light source that is applied to one user interface object and affects one or more adjacent user interface objects. The light source may be represented by lighting model 58.

For example, a red light source may be applied to a selected user interface window 104 having a user notification. In FIG. 5, the selected user interface window 104 is shown in outline to indicate that another window 106 is positioned in front and obscured window 104. The light may be modeled as radiating or reflecting from the selected user interface window 104 onto one or more adjacent user interface objects (e.g., window 108) by operation of three-dimensional rendering engine 60. As illustrated, even if the selected user interface window 104 is positioned behind another object or totally off the display screen, the inter-object lighting 102 can provide a penumbra effect that can be discernible by a user as an unobtrusive influence on other visible objects or windows (e.g., window 108), even though those other objects are unrelated to the notification.

Such inter-object lighting 102 allows the user interface to provide ambient notification without having to bring to the front of other active user interface objects (e.g., windows) a notification or a window with notification, or otherwise alter the screen layout in a distracting fashion. Inter-object lighting 102 also leverages the human perceptual ability to tell where light is coming from so that a user could usually discern the direction from which the light is reflected or radiated (i.e., the selected user interface window). As a result, the user can readily comprehend the general location of the selected user interface window without any additional user interface affordance.

Figure 6:
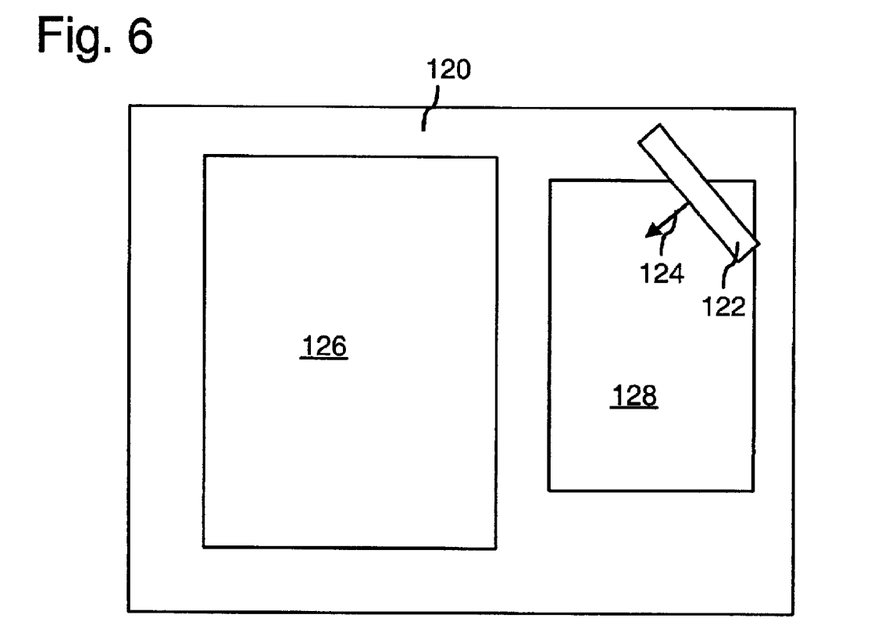
FIG. 6 is a schematic illustration of a noisy user interface desktop as rendered on a display screen with ambient notification provided by a shadow passing over the desktop.

FIG. 6 is a schematic illustration of a noisy user interface desktop 120 as rendered on a display screen with a shadow 122 (e.g., a stripe) formed to pass in a direction 124 over user interface objects (e.g., windows 126 and 128) to provide ambient notification. For example, shadow 122 may be generated by modeling the passing of an off-screen object in front of the light source of the lighting model 58. Accordingly, an ambient notification can be provided as a moving shadow 122. It will be appreciated that such a lighting change could be done either above or below the JND, to provide either ambient or direct notifications.

Shadow 122 may simply pass across desktop 120, as illustrated, or may pass from or toward a user interface object (obscured or not) that is the source of the notification. The shadow 122 can provide an effect similar to that of an airplane flying low overhead and passing a shadow over the heard of a person on the ground. For example, a shadow 122 could pass over the desktop when an email message arrives. This type of ambient change in light is readily recognizable and discernible by users without being disruptive.

Figure 7:
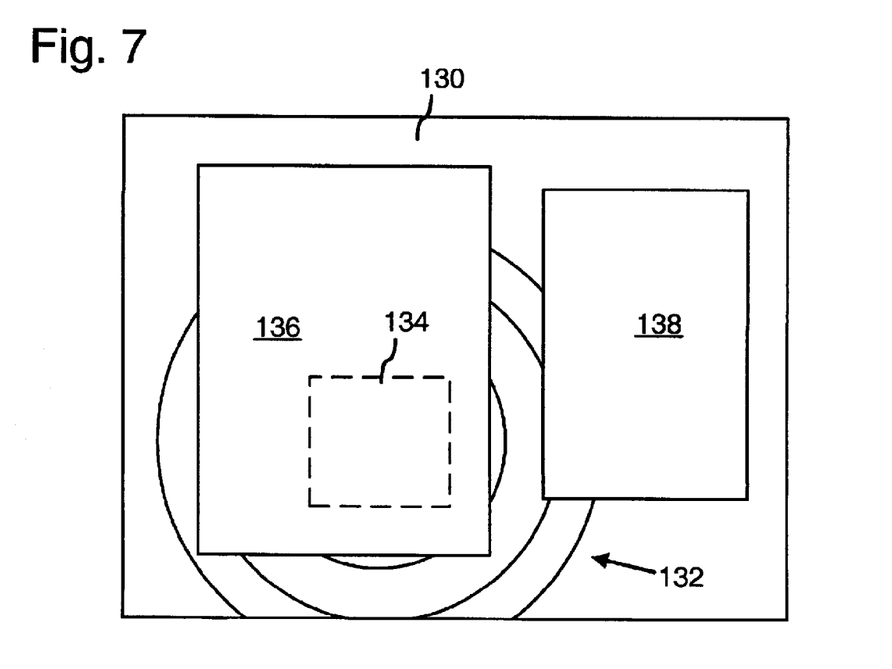
FIG. 7 is a schematic illustration of a noisy user interface desktop as rendered on a display screen with ambient notification provided by a short-term rippled surface effect.

FIG. 7 is a schematic illustration of a noisy user interface desktop 130 as rendered on a display screen with a short-term surface effect 132 imparted on desktop 130, such as by using a texture map to simulate an optically reactive surfaces. Ambient notification of an event can be generated by perturbing the surface, which may or may not undergo continued motion in response to the perturbation.

For example, desktop 130 could be modeled as a water surface on which user interface objects (e.g., windows) are modeled as floating on a water surface (i.e., the desktop) represented by a texture map 56. An ambient notification could be effected as ripples 132 in the water surface emanating from the object (e.g., window 134) with the notification, even if the object is otherwise obscured by one or more other objects (e.g., window 136). In the illustrated implementation, ripples 132 affect the surface of desktop 130 and so pass under other rendered objects (e.g., windows 136 and 138). As other examples, a liquid surface other than water could be modeled, such as mercury, for example. Also, non-liquid media could be modeled, such as sand or dirt in which tracks are left as an ambient notification.

For example, ripples could emanate from a user's mailbox and gradually dissipate when a new email message arrives. Again, human perception allows a user to readily discern the source of such an effect, even if that point is not currently rendered on the display screen. It has been determined that a user could discern the direction of source of ripples if only a few degree segment of a circular rippling pattern could be seen.

Long-term surface effects can be used to display steady or generally constant low-level status information by slowly altering the textures of objects over time. For example, the surfaces of user interface objects that are frequently used could rendered to appear dirty, rough, or scratched. User interface objects that are frequently in contact could be rendered to appear to "stain" each other. User interface objects that are unused over predetermined periods of time could be rendered to appear dusty.

In one implementation, noisy user interface system 50 can allow a user to select the "amplitude" of the ambient notifications relative to the amplitude of the background noisy display. For example, a user could select from a range of ambient notification amplitudes (e.g., 1%–50% of background noisy display amplitude). It would be expected that in using noisy user interface system 50 many users would adopt lower ambient notification amplitudes as their perceptiveness of the ambient notifications increased relative to the highly disruptive notifications of conventional displays.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. For example, ambient notifications and an associated noisy background are described as being provided by an operating system shell. It will be appreciated, however, that a noisy graphical user interface in accordance with the present invention could alternatively be provided by application software rather than an operating system shell. Rather, we claim as our invention all such embodiments as may come within the scope and spirit of the following claims and equivalents thereto.

What is claimed is:

1. A computer system having an operating system shell that provides on a display screen a graphical user interface through which a user interacts with the operating system, comprising:

a background noisy display rendered on the display screen in accordance with a background physical lighting model; and an ambient notification rendered over at least a portion of the background noisy display to provide a user notification, the ambient notification being rendered in accordance with an ambient notification physical lighting model that is different from the background physical lighting model.

2. The system of claim 1, the ambient notification is of a temporary duration.

3. The system of claim 1, the ambient notification is below a just noticeable perceptual difference in the background noisy display.

4. The system of claim 1, the background noisy display includes a variation over time in the background physical lighting model.

5. The system of claim 1, the graphical user interface includes user interface objects through which the user interacts with the operating system, the ambient notification including inter-object lighting in which lighting applied to one user interface object affects one or more adjacent user interface objects.

6. The system of claim 1, the graphical user interface includes user interface objects through which the user interacts with the operating system and the ambient notification physical lighting model including a light source model, the ambient notification including a shadow formed over user interface objects and modeled as an off-screen object passing in front of the light source model.

7. The system of claim 1, the graphical user interface includes user interface objects through which the user interacts with the operating system rendered over an underlying desktop that is modeled as having a moveable surface, the ambient notification including imparting a movement in the moveable surface of the desktop.

8. The system of claim 7, the moveable surface propagates imparted movements.

9. The system of claim 8, the propagated imparted movements are modeled as ripples.

10. The system of claim 7, the moveable surface does not propagate imparted movements.

11. The system of claim 10, the imparted movements are modeled as tracks.

12. A computer readable medium that enables an operating system shell to provide on a display screen a graphical user interface through which a user interacts with an operating system, comprising:

a noisy user interface object data structure that includes desktop element models and a lighting model, the desktop element models providing three-dimensional representations of plural noisy graphical user interface desktop objects and tile lighting model having one or more light source representations that each include a light color, light intensity, and light direction; and a three-dimensional rendering engine that provides three-dimensional rendering on a display screen of noisy graphical user interface desktop objects based upon the desktop element models and the lighting model, the three-dimensional rendering engine renders an ambient notification by slightly varying the rendered noisy graphical user interface desktop object while a layout of the noisy graphical user interface desktop objects remains substantially unaltered.

13. The computer readable medium of claim 12, the data structure further comprises one or more desktop element texture maps that are associated with each desktop element model, the desktop element texture maps including at least image color information for each desktop element model.

14. The computer readable medium claim 13, the desktop element texture maps further include one or more of the reflectivity, transparency, reflection, and refraction properties of a surface each desktop element model.

15. The computer readable medium of claim 12, the three-dimensional rendering engine renders on the display screen a background noisy display in accordance with the noisy user interface object data structure.

16. The computer readable medium of claim 15, the background noisy display includes a variation over time in the lighting model.

17. The computer readable medium of claim 15, the three-dimensional rendering engine renders on the display screen ambient notification to provide a user notification, the ambient notification being rendered in accordance with the noisy user interface object data structure.

18. The computer readable medium of claim 17, the ambient notification is of a temporary duration.

19. The computer readable medium of claim 12, the three-dimensional rendering engine renders on the display screen the ambient notification to provide a user notification, the ambient notification being rendered in accordance with the noisy user interface object data structure.

20. The computer readable medium of claim 19, the graphical user interface includes user interface objects through which the user interacts with the operating system, the ambient notification including inter-object lighting in which lighting applied to one user interface object affects one or more adjacent user interface objects.

21. The computer readable medium of claim 19, the graphical user interface includes user interface objects through which the user interacts with the operating system and the ambient notification physical lighting model including a light source model, the ambient notification including a shadow formed over user interface objects and modeled as an off-screen object passing in front of the light source model.

22. The computer readable medium claim 19, ambient notification is below a just noticeable perceptual difference in the noisy graphical user interface desktop objects.

23. The computer readable medium of claim 19, the graphical user interface includes user interface objects through which the user interacts with the operating system rendered over an underlying desktop that is modeled as having a moveable surface, the ambient notification including imparting a movement in the moveable surface of the desktop.

24. The computer readable medium of claim 23, the moveable surface propagates imparted movements.

25. The computer readable medium of claim 24, the propagated imparted movements are modeled as ripples.

26. The computer readable medium of claim 23, the moveable surface does not propagate imparted movements.

27. The computer readable medium of claim 26, the imparted movements are modeled as tracks.

28. An operating system shell graphical user interface rendering method for providing on a display screen a graphical user interface through which a user interacts with an operating system, the method comprising:

rendering a background noisy display rendered on the display screen in accordance with a background physical lighting model; and rendering an ambient notification rendered over at least a portion of the background noisy display to provide a user notification, the ambient notification being rendered in accordance with an ambient notification physical lighting model that is different from the background physical lighting model.

29. The method of claim 28, the graphical user interface includes noisy graphical user interface desktop objects through which the user interacts with the operating system, the method further comprising modeling the noisy graphical user interface desktop objects as three-dimensional representations.

30. The method of claim 28, the background and ambient notification physical lighting models each include one or more light source representations that each include a light color, light intensity, and light direction.

31. The method of claim 28, rendering the background noisy display and the ambient notification each include a three-dimensional rendering on the display screen.

32. The method of claim 28, the ambient notification is of a temporary duration.

33. The method of claim 28, the background noisy display includes a variation over time in the background physical lighting model.

34. The method of claim 28, the ambient notification is below a just noticeable perceptual difference in the background noisy display.

35. A computer system that provides on a display screen a graphical user interface through which a user interacts with computer software, comprising:

a background noisy display rendered on the display screen in accordance with a background physical lighting model; and an ambient notification rendered over at least a portion of the background noisy display to provide a user notification, the ambient notification being rendered in accordance with an ambient notification physical lighting model that is different from the background physical lighting model.

36. The system of claim 35, the ambient notification is of a temporary duration.

37. The system of claim 35, the ambient notification is below a just noticeable perceptual difference in the background noisy display.

38. The system of claim 37, the background noisy display includes a variation over time in the background physical lighting model.

* * * * *